Nov. 23, 1965    J. H. WURSTER    3,219,892
ELECTRIC CAPACITOR COOLING MEANS
Filed Sept. 18, 1962    2 Sheets-Sheet 1
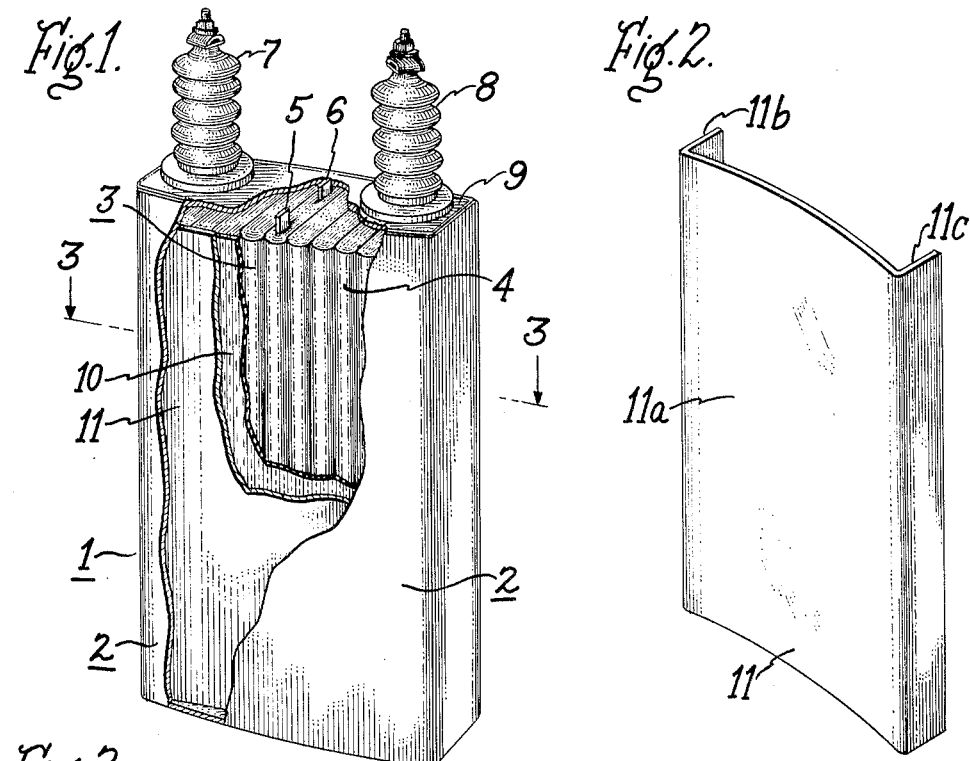
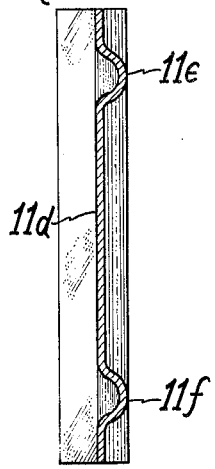
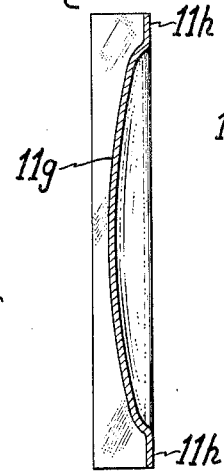
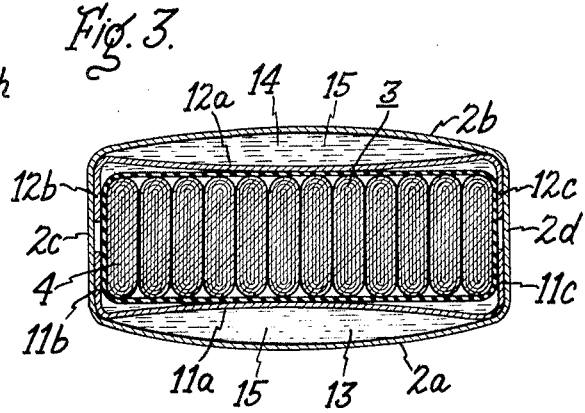
Inventor,
John H. Wurster,
by Sidney Greenberg
His Attorney.

Nov. 23, 1965  J. H. WURSTER  3,219,892
ELECTRIC CAPACITOR COOLING MEANS
Filed Sept. 18, 1962  2 Sheets-Sheet 2
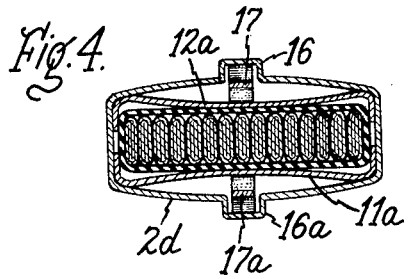
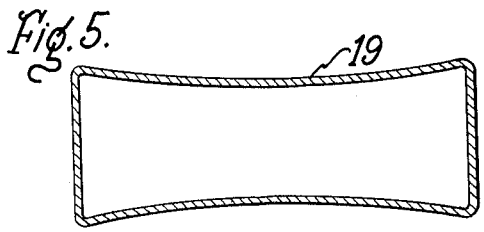
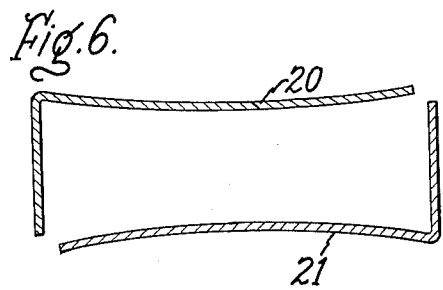
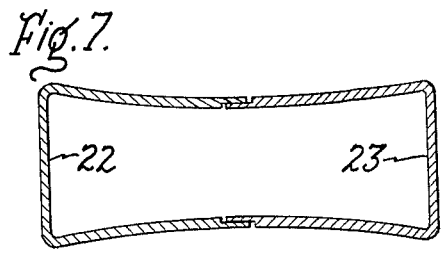
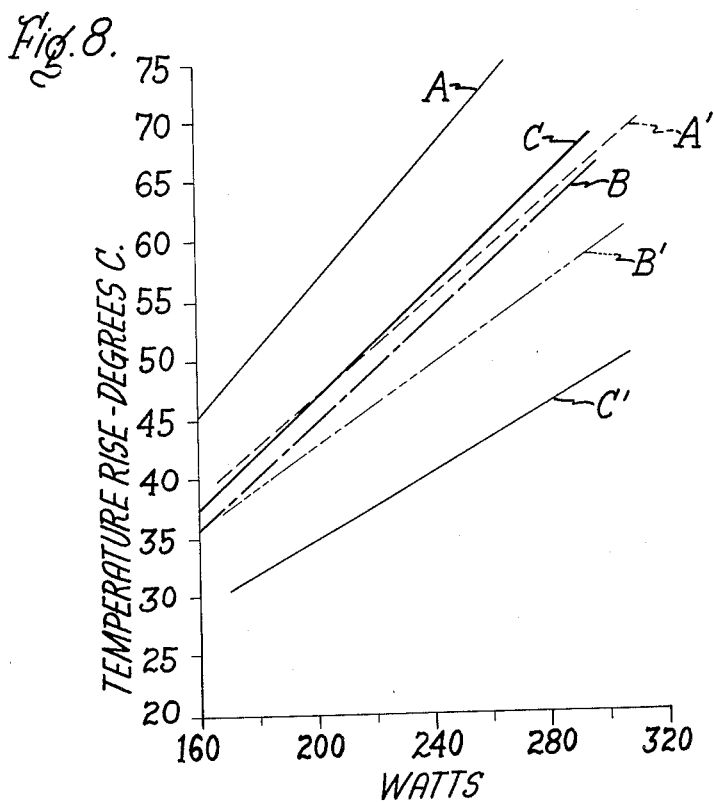
Inventor,
John H. Wurster,
by Sidney Greenberg
His Attorney.

United States Patent Office 3,219,892
Patented Nov. 23, 1965

3,219,892
ELECTRIC CAPACITOR COOLING MEANS
John H. Wurster, Moreau, N.Y., assignor to General
Electric Company, a corporation of New York
Filed Sept. 18, 1962, Ser. No. 224,333
15 Claims. (Cl. 317—243)

The present invention relates to cooling arrangements especially for electrical devices, and more particularly relates to electrical capacitors having improved heat dissipation characteristics.

The efficient removal of heat from capacitors during operation has been recognized as essential in order to obtain satisfactory life characteristics and thermal stability of the units. Also, it is desirable to maintain internal pressure in the capacitors at a suitable level under low temperature conditions so as to retain high resistance to corona under such conditions.

However, the prior capacitor constructions have not provided fully satisfactory results in the respects mentioned. In a conventional design, the capacitor sections are arranged in a tight fit within the outer casing in order to provide good conduction of heat from the interior sections to the casing, but in such arrangements when the capacitor cools down under low temperature conditions, low pressure conditions develop in the capacitor because the casing walls are prevented by such tight fitting sections from contracting inwardly as the dielectric liquid contracts. On the other hand, while loosely fitting capacitor sections enable the attainment of better low temperature corona strength, such an arrangement has reduced heat transfer capability and causes the dielectric to operate at excessively high temperatures, resulting in poor life of the capacitors.

It is an object of the invention to provide sealed electrical devices, and especially electrical capacitors, which avoid the above disadvantages of prior art constructions.

It is another object of the invention to provide electrical capacitors or the like having improved heat dissipation characteristics under high temperature conditions so as to prolong their life and impart improved thermal stability, while maintaining good electrical characteristics of the capacitors under low temperature conditions.

It is still another object of the invention to provide simple and economical means to improve the heat dissipating characteristics of power capacitors or the like when mounted in banks of capacitors in close proximity to one another.

Other objects and advantages will become apparent from the following description and the appended drawings.

With the above objects in view, the present invention in a preferred embodiment relates to an electrical capacitor comprising a container having a pair of opposite side walls adapted to flex with variation in temperature and opposite end walls joining the side walls, dielectric liquid in the container in which a capacitor pack is immersed and which produces heat during operation of the capacitor, the capacitor pack being spaced from the opposite side walls of the container so as to define therewith spaces occupied by the dielectric liquid, and heat conducting plate means arranged between the capacitor pack and the container side walls having main portions in the spaces in constant contact with the capacitor pack and having other portions adjacent the container end walls, whereby during operation of the capacitor the plate means transfers heat from the capacitor pack to the container end walls, and the container side walls are free to flex inwardly into the spaces described during thermal contraction of the dielectric liquid therein.

The invention will be better understood from the following description taken in conjunction with the accompanying drawings, in which:

FIGURE 1 is a perspective view, partly broken away, of an electrical power capacitor embodying the invention;

FIGURE 2 is a perspective view of one of the heat transfer members employed in the FIGURE 1 device in accordance with the invention;

FIGURE 2a is a view in vertical section of a modified form of heat transfer member;

FIGURE 2b is a view in vertical section of another modified form of heat transfer member;

FIGURE 3 is a cross-sectional view of the FIGURE 1 device taken along the line 3—3;

FIGURE 4 shows a similar cross-sectional view of a modfied arrangement;

FIGURES 5, 6 and 7 are diagrammatic views showing various forms of heat transfer members which may be employed in accordance with the invention; and FIGURE 8 is a graphical showing of the improved properties provided by the invention as compared to prior art devices.

Referring now to the drawings, and particularly to FIGURE 1, there is shown a power capacitor 1 comprising a rectangular metal container or casing 2 containing capacitor pack 3 made up of a plurality of flattened roll sections 4, each of which is formed of a pair of electrode foils interwound with dielectric sheets in a manner well-known in the art. Each roll section 4 has electrode terminal tabs 5 and 6 connected to the respective electrode foils and projecting from the upper ends of the capacitor roll section. The terminal tabs are suitably electrically connected to leads (not shown) which extend through terminal bushings 7 and 8 mounted on cover 9. Instead of having terminal tabs as described, the capacitor roll sections may be of exposed foil arrangement well-known in the art, in which the foil armatures project from opposite ends of the roll and leads are suitably attached to the exposed foils. Capacitor pack 3 is wrapped in a covering of insulating material 10, referred to herein as major insulation, such as one or more layers of kraft paper, which separates pack 3 from metal casing 2. Casing 2 is hermetically sealed by cover 9 and contains a dielectric liquid such as chlorinated diphenyl, mineral oil or the like, in which capacitor pack 3 is immersed and which impregnates the dielectric paper sheets thereof. Instead of being a liquid, the dielectric medium may be a gas, such as sulfur hexafluoride.

In accordance with the invention, there are provided in casing 2, as best seen in FIGURE 3, heat transfer plates 11 and 12 having a height approximately the same as capacitor pack 3 and shaped as shown in FIGURE 2, the plates being arranged between the casing walls and major insulation 10 substantially surrounding the insulated capacitor pack, and normally resting on the bottom of the casing. Each plate 11, 12 is preferably made of a metal of high thermal conductivity such as aluminum, and comprises, as shown in the FIGURE 2 embodiment, an inwardly bowed main portion 11a and flange portions 11b, 11c projecting therefrom. The dimensions of each plate 11, 12 are such that when assembled in casing 2 the the plates fit snugly between the opposite end walls 2c, 2d of casing 2 with their flange portions 11b, 11c and 12b, 12c in contact with or in close proximity to the respective end walls, and with the bowed plate portions 11a, 12a pressing inwardly in constant contact with opposite sides of insulated capacitor pack 3 as shown in FIGURE 3. Capacitor pack 3 is usually of sufficient length such that the flange portions of plates 11, 12 fit tightly between the ends of the capacitor pack 3 and the adjacent end walls of casing 2. In a preferred embodiment, the broad sides 2a, 2b of casing 2 are bowed somewhat outwardly as shown in FIGURE 3, for reasons explained hereinafter.

By virtue of the arrangement described, plates 11 and 12 are in continuous contact through major insulation 10 with the central portions of capacitor pack 3, which normally are the hottest portions during the operation of the capacitor, and plates 11, 12 will conduct the heat from these areas to the normally cooler end walls 2c, 2d and the bottom of casing 2. Since capacitors of this type are frequently mounted in banks with their broad sides facing one another in close proximity, the heat dissipation problem in the use of conventional power capacitors is especially troublesome because in such units, as indicated, the broad side walls are usually the hottest portion of the casing and radiate the heat toward one another. The transference of heat to the cooler end walls and bottom of the outer casing as effected by the cooling plate arrangement of the invention thus largely overcomes this problem and by obtaining thereby lower dielectric temperatures in the capacitor, longer life and better thermal stability of the capacitor are achieved.

In the described arrangement, spaces 13 and 14 occupied by dielectric liquid 15 are defined between the inwardly bowed cooling plates 11, 12 and the adjacent outwardly bowed broad side walls 2a, 2b of casing 2, the size of the spaces depending on the extent of outward bowing of side walls 2a, 2b and the difference in width between capacitor pack 3 and the casing. The presence of spaces 13, 14 makes it possible for the broad side walls 2a, 2b of the casing to flex inwardly during cooling of the capacitor following the contraction of the dielectric liquid 15 during such cooling. As a result, the drop in internal pressure which would otherwise occur if inward flexing of the broad side walls of the casing is prevented by a tightly fitting capacitor pack is considerably reduced, and the problem of low corona strength attendant on low internal pressure is thereby overcome. Moreover, the dielectric reservoir in spaces 13 and 14 aids in the cooling of capacitor pack 3, since the dielectric liquid 15 therein will circulate by convection in these spaces and transfer heat from the normally hotter central portions to the cooler end walls and bottom of capacitor casing 2. This means of heat transfer improves as the capacitor becomes hotter due, for example, to voltage increase.

If desired, plates 11, 12 may be modified to facilitate circulation of dielectric liquid in spaces 13, 14 from one side of each plate to the other by providing apertures or cutout portions in the body or at the top or bottom of the plates.

Advantageously, cooling plates 11, 12 have a thermal expansion coefficient greater than that of the metal of casing 2, since under such conditions the pressure of plates 11, 12 on capacitor pack 3 increases with increasing temperature due to the more rapid expansion of the plates as compared to the casing walls. Such results are obtained, for example, when the plates are made of aluminum and the casing metal is mild steel or stainless steel. The increased pressure of the plates on the capacitor pack improves heat transference from the pack to the plates and then to the capacitor end walls, and thereby further reduces the operating temperature of the capacitor pack.

FIGURE 2a shows in vertical cross-section a modified form of the heat transfer plate shown in FIGURE 2 which comprises a similarly inwardly bowed main portion 11d having outwardly projecting bosses 11e and 11f which when the plate is assembled in case 2, press against the inner surface of the container side wall. Bosses 11e, 11f thus serve to ensure constant contact of the heat transfer plate against capacitor pack 3 and maintain the reservoir space for the dielectric liquid 15. The bosses are preferably arranged near the top and bottom of the heat transfer plate so that they contact the container side wall near its cooler top and bottom portions and thereby improve the heat transfer characteristics, while at the same time they do not interfere with the inward flexing of the container side wall in view of their location away from the central portion of the latter.

FIGURE 2b shows another modification of the heat transfer plates wherein the bowed center portion of the plate has an inwardly dished central region 11g. In operation, the outside rim 11h of the heat transfer plate presses in direct contact with the container side wall and the central dished portion 11g presses against capacitor pack 3. There is thereby provided additional assurance that the heat transfer plates will remain in constant contact with the sides of capacitor pack 3 and that the dielectric liquid reservoirs between the pack and container side wall will be maintained.

FIGURE 4 shows a modification of the FIGURE 3 device which includes recesses or channels 16 and 16a formed in the side walls of casing 2d for retaining leaf springs 17, 17a bearing with their convex surfaces against the central portions of bowed cooling plates 11a, 12a, and with their ends against casing 2d, thereby providing increased pressure of the plates against the capacitor pack, and also adding to the dielectric liquid reservoir space. Coil springs or other equivalent resilient members could be employed instead of leaf springs if desired.

FIGURE 5 shows a variation in the form of the cooling plates wherein the cooling plate means are constituted by an integral tubular member or sleeve 19 having inwardly bowed broad side portions joined by straight end portions, tubular member 19 being proportioned to snugly fit within the outer capactor casing and against the capacitor pack inserted in its interior space.

FIGURE 6 shows another embodiment comprising a pair of angular plates 20, 21 each formed with a bowed main portion and a single straight flange portion at an angle thereto, so that when assembled as shown the two plates together encompass and press against the capacitor pack substantially as in the FIGURE 3 embodiment.

FIGURE 7 shows still another modification wherein the plates are formed of telescoping U-shaped members 22, 23 with their web portions at opposite ends and with their arms bowed inwardly as shown. Such an arrangement may be fitted within capacitor casings of various widths simply by extending or retracting the telescoped members relative to one another.

Tests were made comparing temperature rises for standard capacitors and similar capacitors incorporating cooling plates constructed and arranged in accordance with the invention. FIGURE 8 is a graph showing the results of these tests, the graph plotting the temperature in °C. against watts loss. In tests tests, a group of each type of unit were mounted with their broad sides facing one another at a spacing of 2¾ inches between cases and were operated in an ambient temperature of about 45° C. The curves in the graph represent the following:

Curve A—maximum dielectric temperature—standard unit
Curve A′—maximum dielectric temperature—cooling plate unit
Curve B—average dielectric temperature—standard unit
Curve B′—average dielectric temperature—cooling plate unit
Curve C—maximum case temperature—standard unit
Curve C′—maximum case temperature—cooling plate unit As is evident from the graph, in each of the temperature categories measured, the capacitors equipped with a cooling plate arrangement in accordance with the invention were characterized by a substantially lower temperature than the standard units. At 220 watts, for example, the maximum dielectric temperature (i.e., hot spot temperature) of the units of the invention was about 11½° C. less than that of the standard units.

The heat transfer plate arrangement of the invention has a number of advantages in addition to those already mentioned. They may, for example, serve as a holding device or funnel to facilitate assembly of the capacitor pack and major insulation in the outer container. The cooling plates not only assist in removing the heat from the capacitors during operation, but they also assist in introducing the necessary heat into the capacitor elements during the usual treating process employed in manufacture of the capacitors. When made of aluminum, the plates improve the quality of the dielectric liquid due to the "getter" action of the aluminum oxide film normally present on the aluminum, by which electrically deleterious particles are removed from the liquid.

While the invention has been described particularly with respect to power capacitors, it is evident that it has application to other types of capacitors such as high energy storage capacitors, pulse forming capacitors, and other electrical devices, and also to apparatus in general where the dissipation of heat from the apparatus is a problem.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Electrical capacitor comprising a container having a pair of opposite side walls and a pair of opposite end walls joining said side walls, a dielectric fluid in said container, a capacitor pack which produces heat during operation thereof in said dielectric fluid thereby causing thermal expansion and contraction of said dielectric fluid, said capacitor pack being spaced from said opposite side walls of said container so as to define therewith spaces occupied by said dielectric fluid, said container side walls being free to flex inwardly into said spaces during thermal constration of said dielectric fluid, and metal heat conducting means arranged between said capacitor pack and said container having main portions in said spaces in constant contact with said capacitor pack and having other portions in physical contact with said container end walls, whereby during operation of said capacitor pack said heat conducting means transfers heat therefrom to said container end walls.

2. Electrical capacitor comprising a container having a pair of opposite side walls and a pair of opposite end walls joining said side walls, a dielectric liquid in said container, a capacitor pack which produces heat during operation thereof immersed in said dielectric liquid thereby causing thermal expansion and contraction of said dielectric liquid, said capacitor pack being spaced from said opposite side walls of said container so as to define therewith spaces occupied by said dielectric liquid, said container side walls being free to flex inwardly to said spaces during thermal contraction of said dielectric liquid, and metal heat conducting plate means arranged between said capacitor pack and said container having main portions in said spaces in constant contact with said capacitor pack and having other portions in physical contact with said container end walls, whereby during operation of said capacitor pack said heat conducting plate means transfers heat from said capacitor pack to said container end walls.

3. Electrical capacitor comprising a rectangular container having a pair of opposite side walls adapted to flex with variation in capacitor temperature and opposite end walls joining said side walls, a dielectric liquid in said container, a rectangular capacitor pack including an insulating covering thereon immersed in said dielectric liquid and spaced from said opposite container side walls so as to define therewith spaces occupied by said dielectric liquid, said capacitor pack producing heat during operation thereof, and heat conducting metal plate means arranged between said capacitor pack and said container substantially surrounding said capacitor pack, said metal plate means having main portions in said spaces in constant contact with said capacitor pack and having other portions adjacent said container end walls, whereby during operation of said capacitor said metal plate means transfers heat from said capacitor pack to said container end walls and said container side walls are free to flex inwardly into said spaces during thermal contraction of the dielectric liquid therein.

4. Electrical capacitor comprising a rectangular container having a pair of opposite side walls adapted to flex with variation in capacitor temperature and opposite end walls joining said side walls, a dielectric liquid in said container, a rectangular capacitor pack including an insulating covering thereon immersed in said dielectric liquid and spaced from said opposite container side walls so as to define therewith spaces occupied by said dielectric liquid, said capacitor pack producing heat during operation thereof, and heat conducting metal plates arranged between said capacitor pack and said container substantially surrounding said capacitor pack, said metal plates having inwardly dished central portions in said spaces in constant contact with said capacitor pack and having other portions adjacent said container end walls, whereby during operation of said capacitor said metal plates transfer heat from said capacitor pack to said container end walls and said container side walls are free to flex inwardly into said spaces during thermal contraction of the dielectric liquid therein.

5. Electrical capacitor comprising a rectangular container having a pair of opposite side walls adapted to flex with variation in capacitor temperature and opposite end walls joining said side walls, a dielectric liquid in said container, a rectangular capacitor pack including an insulating covering thereon immersed in said dielectric liquid and spaced from said opposite container side walls so as to define therewith spaces occupied by said dielectric liquid, said capacitor pack producing heat during operation thereof, and heat conducting metal plates arranged between said capacitor pack and said container substantially surrounding said capacitor pack, said metal plates having main portions in said spaces in constant contact with said capacitor pack and having other portions adjacent said container end walls, the main portions of said metal plates having outwardly projecting portions in contact with said container side walls for maintaining said main portions in constant contact with said capacitor pack while spacing said main portions from said container side walls, whereby during operation of said capacitor said metal plates transfer heat from said capacitor pack to said container end walls and said container side walls are free to flex inwardly into said spaces during thermal contraction of the dielectric liquid therein.

6. An electrical capacitor as defined in claim 3, wherein said metal plate means comprises a pair of plates having main portions between the respective container side walls and said capacitor pack and flange portions between the respective container end walls and said capacitor pack, said main portions being bowed inwardly and in constant contact with said capacitor pack.

7. An electrical capacitor as defined in claim 3, wherein said metal plate means comprises an integral rectangular tubular member having opposite main portions between the respective container side walls and said capacitor pack and end portions between the respective container end walls and said capacitor pack, said main portions being bowed inwardly in constant contact with said capacitor pack.

8. An electrical capacitor as defined in claim 3, wherein said metal plate means comprises a pair of angular plates each having a main portion between the respective side wall and said capacitor pack and a flange portion between the respective end wall and said capacitor pack, each main portion being bowed inwardly in constant contact with said capacitor pack.

9. An electrical capacitor as defined in claim 3 wherein said metal plate means comprises a pair of U-shaped members arranged in complementary telescoping relation at their open ends with the arm portions thereof arranged between the respective container side walls and said capacitor pack and the web portions thereof between the respective end walls and said capacitor pack, the arm portions being bowed inwardly in constant contact with said capacitor pack.

10. An electrical capacitor comprising a container having a pair of opposite side walls, a pair of opposite end walls joining said side walls, a top, and a bottom, said side walls being adapted to flex with variations in temperature of the capacitor and being normally bowed outwardly, a dielectric liquid in said container, a capacitor pack immersed in said dielectric liquid and adapted to produce heat during operation thereof, said capacitor pack comprising a plurality of wound capacitor roll sections arranged with their axes parallel to the container side walls, said capacitor pack being spaced from said opposite side walls so as to define therewith spaces occupied by said dielectric liquid, and heat conducting metal plate means arranged between said capacitor pack and said container and substantially surrounding said capacitor pack, said metal plate means having main portions in said spaces in constant contact with said capacitor pack and other portions adjacent said container end walls, whereby during operation of the capacitor said plate means transfers heat from said capacitor pack to said container end walls and the container side walls are free to flex inwardly into said spaces during thermal contraction of the dielectric liquid therein.

11. Electrical capacitor comprising a rectangular metal container having a pair of opposite side walls adapted to flex with variation in capacitor temperature and opposite end walls joining said side walls, a dielectric liquid in said container, a rectangular capacitor pack including insulating covering thereon immersed in said dielectric liquid and adapted to produce heat during operation thereof, said capacitor pack being spaced from said opposite container side walls so as to define therewith spaces occupied by said dielectric liquid, and heat conducting metal plate means composed of metal having a higher coefficient of thermal expansion than said metal container and arranged between said capacitor pack and said container substantially surrounding said capacitor pack, said metal plate means having main portions in said spaces in constant contact with said capacitor pack and other portions adjacent said container end walls, whereby during operation of the capacitor said metal plate means transfers heat from said capacitor pack to said container end walls and said container side walls are free to flex inwardly into said spaces during thermal contraction of the dielectric liquid therein.

12. Electrical capacitor comprising a rectangular container having a pair of opposite side walls adapted to flex with variation in capacitor temperature and opposite end walls joining said side walls, a dielectric liquid in said container, a rectangular capacitor pack including insulating covering thereon immersed in said dielectric liquid and adapted to produce heat during operation thereof, said capacitor pack being spaced from said opposite container side walls so as to define therewith spaces occupied by said dielectric liquid, heat conducting metal plate means arranged between said capacitor pack and said container substantially surrounding said capacitor pack, said metal plate means having main portions in said spaces in constant contact with said capacitor pack and other portions adjacent said container end walls, and means urging said main portions in constant contact with said capacitor pack, whereby during operation of said capacitor said metal plate means transfers heat from said capacitor pack to said container end walls, and said container side walls are free to flex inwardly into said spaces during thermal contraction of the dielectric liquid therein.

13. Electrical capacitor comprising a rectangular container having a pair of opposite side walls adapted to flex with variation in capacitor temperature and opposite end walls joining said side walls, a dielectric liquid in said container, a rectangular capacitor pack including insulating covering thereon immersed in said dielectric liquid and adapted to produce heat during operation thereof, said capacitor pack being spaced from said opposite container side walls so as to define therewith spaces occupied by said dielectric liquid, heat conducting metal plate means arranged between said capacitor pack and said container substantially surrounding said capacitor pack, said metal plate means having main portions in said spaces in constant contact with said capacitor pack and other portions adjacent said container end walls, and resilient means arranged between said container side walls and said main portions of said metal plate means for urging said main portions in constant contact with said capacitor pack, whereby during operation of said capacitor said metal plate means transfers heat from said capacitor pack to said container end walls, and said container side walls are free to flex inwardly into said spaces during thermal contraction of the dielectric liquid therein.

14. Electrical capacitor comprising a rectangular container having a pair of opposite side walls adapted to flex with variation in capacitor temperature and opposite end walls joining said side walls, a dielectric liquid in said container, a rectangular capacitor pack including an insulating covering thereon immersed in said dielectric liquid and spaced from said opposite container side walls so as to define therewith spaces occupied by said dielectric liquid, said capacitor pack producing heat during operation thereof, and aluminum plate means arranged between said capacitor pack and said container substantially surrounding said capacitor pack, said aluminum plate means having main portions in said spaces in constant contact with said capacitor pack and having other portions adjacent said container end walls, whereby during operation of said capacitor said aluminum plate means transfers heat from said capacitor pack to said container end walls and said container side walls are free to flex inwardly into said spaces during thermal contraction of the dielectric liquid therein.

15. Electrical capacitor comprising a rectangular container having a pair of opposite side walls adapted to flex with variations in capacitor temperature and opposite end walls joining said side walls, a dielectric liquid in said container, a rectangular capacitor pack including an insulating covering thereon immersed in said dielectric liquid and spaced from said opposite container side walls so as to define therewith spaces occupied by said dielectric liquid, said capacitor pack producing heat during operation thereof, and aluminum heat conducting plates arranged between said capacitor pack and said container substantially surrounding said capacitor pack, said aluminum plates having main portions in said spaces in constant contact with said capacitor pack and having other portions adjacent said container end walls, whereby during operation of said capacitor said aluminum plates transfer heat from said capacitor pack to said container end walls and said container side walls are free to flex inwardly into said spaces during thermal contraction of said dielectric liquid therein.

(References on following page)

References Cited by the Examiner

UNITED STATES PATENTS

| | | | |
|---|---|---|---|
| 1,555,252 | 10/1925 | Priess | 217—261 |
| 2,566,195 | 8/1951 | Hardy et al. | 317—259 |
| 2,881,364 | 4/1959 | Denner | 317—100 |
| 2,933,664 | 4/1960 | Lunderholm | 317—243 |
| 2,942,167 | 6/1960 | Twaddell et al. | 317—243 |
| 3,098,956 | 7/1963 | Hammer | 317—243 |

FOREIGN PATENTS

| | | |
|---|---|---|
| 648,028 | 12/1950 | Great Britain. |
| 521,997 | 2/1956 | Canada. |

OTHER REFERENCES

Marbury R. E.: Power Capacitors, McGraw-Hill, New York, 1949 QC587M3, page 9.

JOHN F. BURNS, *Primary Examiner*.

E. JAMES SAX, *Examiner*.